United States Patent
Matthey et al.

(10) Patent No.: US 10,532,786 B1
(45) Date of Patent: Jan. 14, 2020

(54) PORTABLE ACTIVE LIGHTING DEVICE OR SAME INSTALLED ON A BICYCLE

(71) Applicant: The Swatch Group Research and Development Ltd, Marin (CH)

(72) Inventors: Olivier Matthey, Mauborget (CH); Michel Willemin, Preles (CH); Bruno Scagliarini, Vallamand (CH)

(73) Assignee: The Swatch Group Research and Development Ltd, Marin (CH)

( * ) Notice: Subject to any disclaimer, the term of this patent is extended or adjusted under 35 U.S.C. 154(b) by 0 days.

(21) Appl. No.: 16/509,690

(22) Filed: Jul. 12, 2019

(30) Foreign Application Priority Data

Aug. 28, 2018 (EP) ..................................... 18191095

(51) Int. Cl.
*H05B 33/00* (2006.01)
*B62J 6/00* (2006.01)
(Continued)

(52) U.S. Cl.
CPC ................. *B62J 6/003* (2013.01); *B62J 6/02* (2013.01); *H05B 33/0854* (2013.01); *H05B 37/0218* (2013.01); *H05B 37/0227* (2013.01)

(58) Field of Classification Search
CPC .......... G06F 3/017; G06F 3/013; G06F 1/163; G06F 3/011; G06F 3/005; G06F 3/012; G06F 3/03547; G06F 13/00; G06F 3/00; G06F 3/014; G06F 3/0227; G06F 3/0346; G06F 3/04815; G06F 3/0488; G06F 3/167; G06F 1/16; G06F 21/32;
(Continued)

(56) References Cited

U.S. PATENT DOCUMENTS

| 5,798,911 A | 8/1998 | Josic |
| 6,587,573 B1 | 7/2003 | Stam et al. |

(Continued)

FOREIGN PATENT DOCUMENTS

| DE | 10 2015 225 890 A1 | 6/2016 |
| EP | 0 699 559 A2 | 3/1996 |

(Continued)

OTHER PUBLICATIONS

European Search Report dated Feb. 14, 2019 in European Application 18191095.1 filed on Aug. 28, 2018 (with English Translation of Categories of Cited Documents).

*Primary Examiner* — Monica C King
(74) *Attorney, Agent, or Firm* — Oblon, McClelland, Maier & Neustadt, L.L.P.

(57) ABSTRACT

An active lighting device of a bicycle includes a first optical system with a first light source arrangement for long-distance illumination, which is controlled by a control unit, and a second optical system with a second light source arrangement for short-distance illumination, which is controlled by the control unit. A light sensor determines the light intensity of a location of the bicycle and allows the control unit to adapt the light intensity of the light sources, if they are activated and if the ambient light intensity is below a threshold. A speed sensor determines the speed of the bicycle, so that the control unit controls the activation of the light sources of the first light source arrangement from a speed threshold. An orientation or inclination detector selects and adjusts the light intensity of light sources.

22 Claims, 2 Drawing Sheets

(51) Int. Cl.
*H05B 33/08* (2006.01)
*B62J 6/02* (2006.01)
*H05B 37/02* (2006.01)

(58) Field of Classification Search
CPC ..... G06F 2203/0331; G06F 2203/0338; G06F
3/016; G06F 3/0304; G06F 3/0428; G06F
3/04842; G06F 3/165; G02B 2027/0178;
G02B 27/017; G02B 27/0093; G02B
2027/014; G02B 2027/0118; G02B
2027/0187; G02B 27/0172; G02B 5/30;
G02B 2027/0138; G02B 27/0176; G02B
2027/0147; G02B 2027/0112; G02B
2027/0127; G02B 2027/0132; G02B
27/0149; G02B 5/18; G02B 6/12009;
G02B 2027/011; G02B 2027/0123; G02B
2027/0134; G02B 2207/113; G02B
2207/115; G02B 5/23; G02B 5/3058;
G02B 6/0038; G02B 6/0045; G02B
6/0053; G02B 6/0056; G02B 6/12019;
G02B 7/008; G02B 5/04; G02B 5/1842;
G02B 5/28
See application file for complete search history.

(56) References Cited

U.S. PATENT DOCUMENTS

| | | | |
|---|---|---|---|
| 8,842,176 B2 * | 9/2014 | Schofield | B60R 1/00 348/113 |
| 2001/0012206 A1 | 8/2001 | Hayami et al. | |
| 2003/0123705 A1 | 7/2003 | Stam et al. | |
| 2003/0123706 A1 | 7/2003 | Stam et al. | |
| 2006/0018511 A1 | 1/2006 | Stam et al. | |
| 2008/0129206 A1 | 6/2008 | Stam et al. | |
| 2015/0319825 A1 * | 11/2015 | Destine | H05B 37/0227 315/153 |
| 2016/0185276 A1 * | 6/2016 | Tanaka | B60Q 1/085 362/466 |

FOREIGN PATENT DOCUMENTS

| | | |
|---|---|---|
| EP | 2 420 408 A1 | 2/2012 |
| GB | 2 358 914 A | 8/2001 |
| WO | WO 2017/023293 A1 | 2/2017 |

* cited by examiner

PORTABLE ACTIVE LIGHTING DEVICE OR SAME INSTALLED ON A BICYCLE

CROSS-REFERENCE TO RELATED APPLICATION

This application claims priority to European Patent Application No. 18191095.1 filed on Aug. 28, 2018, the entire disclosure of which is hereby incorporated herein by reference.

TECHNICAL FIELD OF THE INVENTION

The invention relates to a portable active lighting device or such a device installed on a bicycle. Preferably, each lighting device has a first optical system having at least one first light source arrangement, and a second optical system having at least one second light source arrangement, which are placed on the bicycle.

PRIOR ART

A known manner of suitably illuminating a path or road travelled by a vehicle involves using a lighting device with an adaptable configuration of the intensity of the light generated by lamps or other light sources. Such a lighting device can also be adapted so as to orient the light beam as a function of the corners to be turned in the dark or so as not to dazzle a driver of an oncoming vehicle on the road.

Patent application WO 2017/023293 A1 discloses an intelligent lighting system for a two-wheeled vehicle such as a bicycle. It comprises an arrangement of light-emitting diodes or LEDs, which can be independently selected to define a desired light intensity. Motors are also provided so as to orient the light according to the height or inclination of the bicycle, as well as motion or light intensity sensors, and a light arrangement as a function of the bicycle's speed. However, all LEDs are oriented at the same time by the motors and not independently from one another. Moreover, this document does not specify the orientation of each light beam emitted by the LEDs in order to adapt the radiation distance and intensity of each LED as a function of the speed or light intensity detected, which can constitute a drawback.

Patent application US 2018/0020528 A1 discloses a smart lighting system for a bicycle. A light arrangement can be provided on the front fork of the bicycle or also on the helmet of the cyclist. It comprises a motion sensor for detecting the acceleration and speed, and means for turning the light source as a function of a corner or the speed, as well as the movement of the cyclist's head such that the light beam remains aligned at all times with the cyclist's line of sight towards the road. However, it does not provide for orienting two light sources in different manners so as to light the road as a function of the speed or ambient light, which can constitute a drawback.

Patent document EP 3 036 149 B1 discloses a lighting device for a bicycle with a plurality of available LEDs. It also provides for a light sensor. A control element is provided to compare the acceleration, orientation and speed of the cyclist with reference data. A selection of the LEDs is also provided for, however again, this is not intended to orient at least two light sources in different manners in order to light the road travelled, which constitutes a drawback.

Patent document FR 2 844 759 B1 also discloses a motorbike headlight control system with gyrometer. Means are provided in order to orient the light, in particular as a function of the corners turned. However, it does not disclose the orientation of at least two light sources in different manners so as to illuminate the road travelled and taking into account the speed and light intensity detected, which constitutes a drawback.

SUMMARY OF THE INVENTION

The purpose of the invention is thus to overcome the aforementioned drawbacks so as to provide a portable active lighting device or such a device installed on a bicycle having at least two wheels that is easy to use and free of complications, so as to provide good illumination taking into account the speed or inclination of the bicycle.

For this purpose, the invention relates to a portable active lighting device or such a device installed on a bicycle having at least two wheels, which comprises the features of the independent claim 1 or 2.

Specific embodiments of the lighting device are defined in the dependent claims 3 to 22.

One advantage of the lighting device according to the invention lies in the fact that a light sensor of the device detects the ambient light intensity so as to activate light sources or groups of light sources of the optical systems A and B if the ambient light intensity is below a determined light threshold. The light sources or groups of light sources can be automatically activated by a control unit powered by a power voltage source, such as a battery.

Advantageously, the light intensity of the activated light sources or activated groups of light sources is managed by the control unit normally in inverse proportion to the intensity of the ambient light.

Advantageously, the lighting device is equipped with a speed sensor in order to activate light sources or groups of light sources of the optical system A only if a speed of the bicycle in use exceeds a determined speed threshold. Light sources or groups of light sources of the optical system B can be activated as soon as the ambient light intensity falls below the determined light threshold, and independently of the bicycle's speed.

Advantageously, the lighting device can also be equipped with at least one orientation or inclination detector in order to select and adjust the light intensity of at least some light sources or some groups of light sources of the first light source arrangement and/or of the second light source arrangement. The illumination of the light sources or groups of light sources selected, possibly in combination with a set of lenses, allows the resulting light beam originating from each light source arrangement to be oriented in a direction as a function of the corner taken on a road or path.

BRIEF DESCRIPTION OF THE FIGURES

The purposes, advantages and features of a portable active lighting device or such a device installed on a bicycle having at least two wheels will appear more clearly in the following description which is given on the basis of at least one non-limiting embodiment shown by way of the drawings, in which.

DETAILED DESCRIPTION OF THE INVENTION

In the following description, reference is made to a portable active lighting device or to such a device installed on a bicycle having at least two wheels. All of the electronic components that are well known to a person skilled in the art in this technical field are only described in simplified form.

Figure 1:
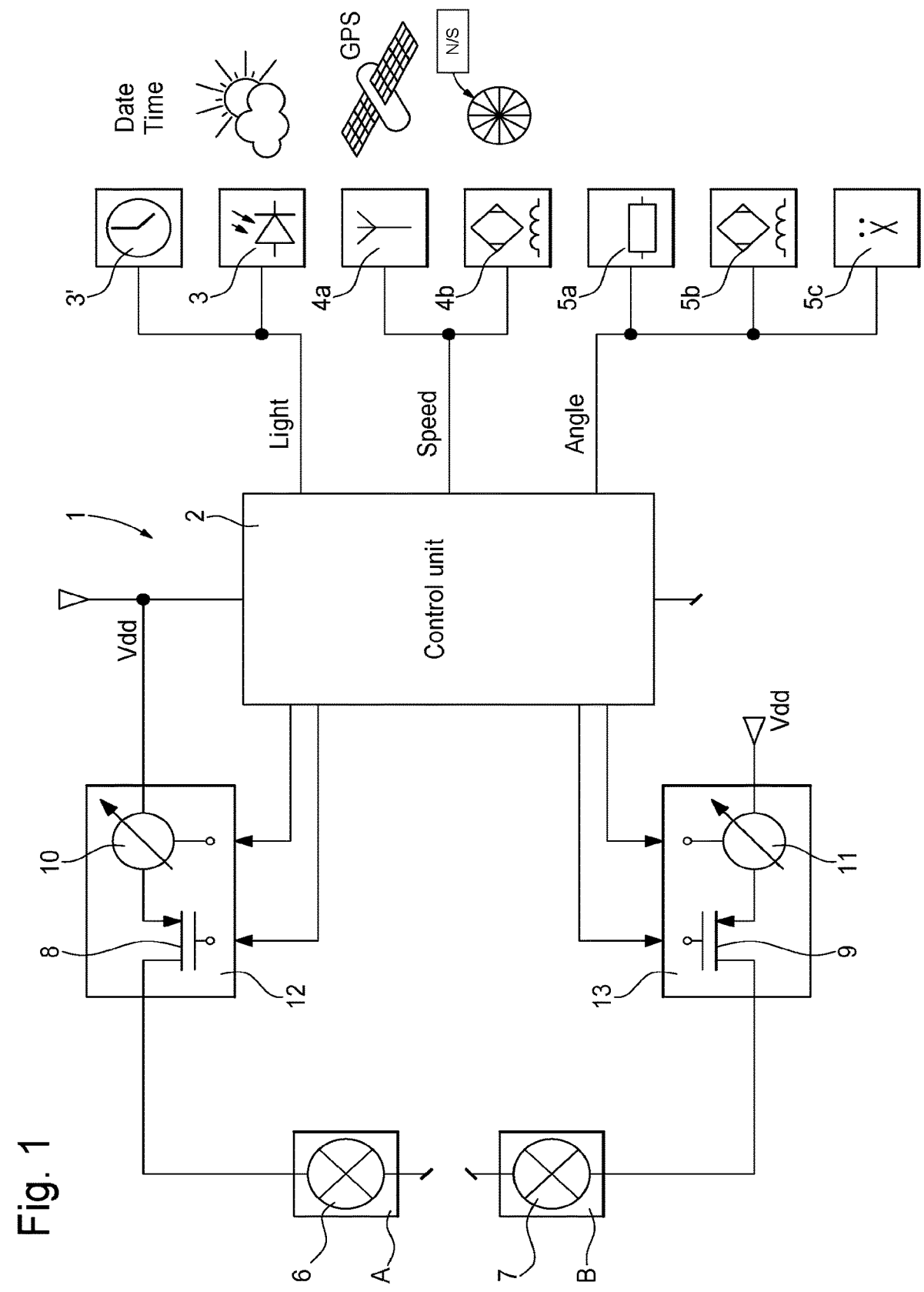
FIG. 1 shows a simplified block diagram of the components of the active lighting device according to the invention.

FIG. 1 shows, in a simplified manner, the different components of a portable active lighting device 1 or such a device installed on a bicycle having at least two wheels. The lighting device 1 mainly comprises two optical systems denoted A and B. The first optical system A comprises at least one first light source arrangement 6, whereas the second optical system B comprises at least one second light source arrangement 7. The first light source arrangement 6 is provided for long-distance illumination, preferably of variable intensity. The second light source arrangement 7 is provided for short-distance illumination, preferably of variable intensity.

Each light source arrangement 6, 7 can comprise light-emitting diodes or groups of light-emitting diodes capable of being selected by a control unit 2 or capable of being activated all at the same time. At least two light sources can be counted per light source arrangement 6, 7. Preferably, at least three light sources can be provided per light source arrangement 6, 7, each of which is capable of generating a light beam in the form of a cone having a different direction or axis of illumination. The orientation of the light beam is provided directly at the output of each light source or by way of one or more lenses. In this manner, some light sources can be selected by the control unit 2 if the medium light beam provided by each activated light source arrangement 6, 7 must be oriented. This allows the medium beam to be oriented as a function of a corner taken by the bicycle user.

It should also be noted that each light source arrangement 6, 7 can comprise an array of light sources, such as light-emitting diodes or LEDs, which can be selected independently from one another or by groups of light-emitting diodes. The array can, for example, comprise $x^2$ light-emitting diodes, where x is an integer greater than or equal to 2. For example, 64 light-emitting diodes can be provided per light source arrangement 6, 7.

Generally speaking, each optical system A and B further comprises, in addition to the light source arrangements 6, 7, an arrangement of lenses combined with the light sources, and of mirrors, not shown, for providing a light beam with a determined orientation. In the scenario shown in FIG. 1, the light sources of the arrangements 6, 7 are controlled by a control unit 2 connected to a continuous power source Vdd. This electrical power source is preferably a DC voltage source originating from a rechargeable or primary battery, or which is extracted and rectified from received electromagnetic radiation.

The lighting device 1 further comprises one or more sensors 3, 4a, 4b, 5a, 5b, 5c connected to the control unit 2 in order to allow each light source arrangement 6, 7 to be activated according to a measured parameter. Preferably, the control unit 2 powered by the DC voltage source Vdd is arranged, as soon as the bicycle is put in use, such that it automatically controls the lighting of the light sources of the first and second arrangements 6, 7 of the first and second optical systems A, B.

The control unit 2 can further comprise a low-frequency oscillator, which can be a MEMS or horological quartz oscillator, and at least one volatile or non-volatile memory. Thus, the control unit 2 can be a microcontroller. The volatile or non-volatile memory, not shown, is used to store measurements carried out by the one or more sensors and at least one calculation algorithm for managing and calculating the measurements carried out by the sensors 3, 4a, 4b, 5a, 5b, 5c.

The lighting device 1 mainly comprises a light intensity sensor or light sensor 3, which can be formed by a solar cell or a network of solar cells. From a luminosity threshold detected by the light intensity sensor 3, the control unit 2 activates at least some light sources or groups of light sources of the first optical system A and of the second optical system B. This occurs if the ambient light intensity is below a determined light threshold. The light intensity threshold can directly depend on the ambient light surrounding the bicycle in use. Moreover, the light intensity of the activated light sources, or activated groups of light sources, can be variable and normally inversely proportional to the change in ambient light intensity.

It should be noted that some light sources or groups of light sources of the second arrangement 7 of the second optical system B are always activated as soon as the ambient light intensity falls below the determined light intensity threshold, during bicycle use. However, some light sources or groups of light sources of the first arrangement 6 of the first optical system A are only activated if the ambient light intensity is insufficient and combined with an additional condition as described hereinbelow.

It goes without saying that, when the bicycle is no longer in use, a manual switch can also be provided so as to deactivate the lighting device for all light sources. Said light sources can also be deactivated after a period of non-use of the bicycle, i.e. after a determined duration without motion, for example after 5 minutes.

In a first alternative embodiment of the device 1, the lighting device 1 comprises at least one speed sensor 4a, 4b connected to the control unit 2. When the bicycle is in use, the speed sensor 4a, 4b determines the bicycle's speed and, once a determined speed threshold is exceeded, activates at least some light sources or groups of light sources of the first arrangement 6 of the first optical system A. Moreover, some light sources or groups of light sources of the first arrangement 6 of the first optical system A generate light if the ambient light intensity detected by the light sensor 3 is below the determined light threshold. As mentioned hereinabove, the selected light sources of the second light source arrangement 7 are activated independently of the bicycle's calculated speed, i.e. as soon as the ambient light intensity detected by the light sensor 3 is below the determined light threshold.

As stated hereinabove, when the bicycle is no longer in use, a manual switch allows the lighting device to be deactivated for all light sources. These light sources can also be deactivated after a determined duration without motion, for example after 5 minutes.

The speed sensor can be a GPS receiver or equivalent 4a, or preferably a magnetic sensor 4b for detecting the passage of at least one permanent magnet positioned on a spoke or on the rim of one of the bicycle's wheels. Each magnetic pulse from the passage of the permanent magnet in the vicinity of the magnetic sensor 4b, and according to a rate in time generated by the low-frequency oscillator, allows the control unit 2 to calculate the speed and the time at which the determined speed threshold is exceeded.

The lighting device 1 can further comprise or receive a calendar 3' of the dates and times (ephemeris dates and times) of each month of the year for a place of use of the device, on the basis whereof the ambient light is deemed insufficient. The control unit 2 can store this calendar 3' of the determined place of use of the device in memory in order to control the activation of the selected light sources of the optical systems A, B if, for example, the determined speed threshold is also exceeded. This determined speed threshold can be set at 15 km/h or 25 km/h, but can also be set to another value and stored in memory.

It is also possible, depending on the location, to vary the activation thresholds depending on whether the bicycle is on an open plain or in a narrow valley, where the ambient light fades faster.

For this purpose, a first intensity regulation unit 12 is supplied, which unit comprises a set of first regulators 10 connected to the power voltage source Vdd. Each of these first regulators 10 are still connected to first respective switches 8, which are themselves connected to the first light source arrangement 6. Each first switch 8 is controlled by the control unit 2 to activate at least some light sources of the first light source arrangement 6 if at least the ambient light intensity is insufficient. A second intensity regulation unit 13 is provided and comprises a set of second regulators 11 connected to the power voltage source Vdd. Each of these second regulators 11 are still connected to second respective switches 9, which are themselves connected to the second light source arrangement 7. Each second switch 9 is controlled by the control unit 2 to activate at least some light sources of the second light source arrangement 7 if at least the ambient light intensity is insufficient.

The first and second switches 8, 9 of each intensity regulation unit 12, 13 are preferably MOS transistors, such as PMOS transistors shown; however, NMOS transistors can also be considered. The source of each first PMOS transistor 8 is connected to each respective first regulator 10, whereas the source of each second PMOS transistor 9 is connected to each respective second regulator 11. The gate of each first PMOS transistor 8 is connected to the control unit 2 in order to make it conducting or non-conducting. The gate of the second PMOS transistor 9 is connected to the control unit 2 in order to make it conducting or non-conducting.

It should be noted that each regulator 10, 11 can be a current source, the current whereof intended to flow in each light source or group of light sources is variable and increases when the ambient light intensity falls below the determined light threshold. The variation in current of each regulator is directly controlled by the control unit 2. The current sources can also be alternating current sources.

It should be noted that the current in a regulator 10, 11 can be different to a current in another regulator 10, 11 according to the command from the control unit 2. This allows the light intensity of a light source or of a group of light sources to be modified relative to another light source or another group of light sources. This ultimately allows, as a function of the selection made of the light sources or groups of light sources of each light source arrangement 6, 7, the medium light beam generated at the output of the optical systems A and B to be oriented.

In a second alternative embodiment of the device 1, the lighting device 1 comprises at least one orientation or inclination detector 5a, 5b, 5c connected to the control unit 2. When the bicycle is in use, the orientation or inclination detector 5a, 5b, 5c determines, for example, a curve travelled by the bicycle in use on a path or road. The orientation or inclination detector 5a, 5b, 5c supplies an orientation or inclination signal to the control unit 2 in order to select and adjust the light intensity of at least some light sources or some groups of light sources of the first light source arrangement 6 and/or of the second light source arrangement 7. The orientation of each light beam is different for the selected light sources or selected groups of light sources, both directly at the output of the light sources or groups of light sources, or by combination with a set of lenses. Thus, as a function of the corner taken, the medium light beam of the selected light sources or selected groups of light sources is directed towards the right for a corner turning to the right or towards the left for a corner turning to the left.

No motor assembly is thus necessary in order to orient the light beams of the selected light sources to allow the medium light beam generated by each light source arrangement 6, 7 to be oriented as a function of the corner or bend to be taken by the bicycle.

In this second alternative embodiment, two light source arrangements 6, 7 can be conceived, which are activated as soon as the ambient light intensity falls below a determined light threshold. However, another possibility involves activating only some of the light sources or groups of light sources of the second light source arrangement 7 if the speed detected by the speed sensor 4a, 4b does not exceed the determined speed threshold.

Figure 3A:
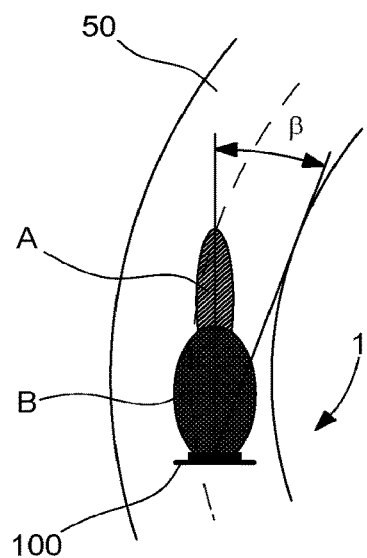
FIGS. 3a, 3b and 3c diagrammatically show a bicycle on a road or path taking a corner in order to select and adjust the light intensity of at least some light sources or some groups of light sources of the optical systems A and B of the active lighting device according to the invention.
Figure 3B:
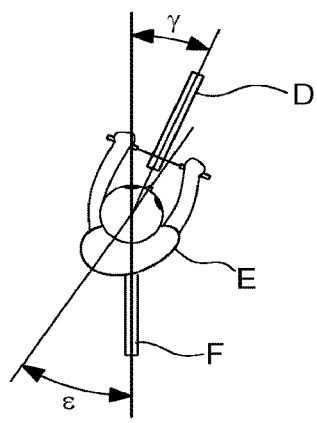
Figure 3C:
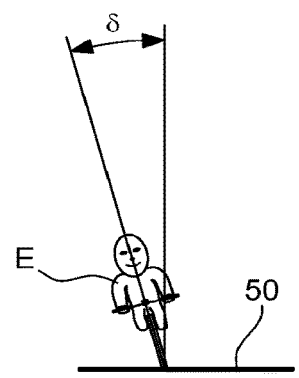

The orientation or inclination detector can be formed by a potentiometer 5a and/or a magnetometer 5b and/or an inclinometer 5c and/or an accelerometer 5c and/or a gyrometer 5c as explained hereafter with reference to FIGS. 3a to 3c.

Figure 2:
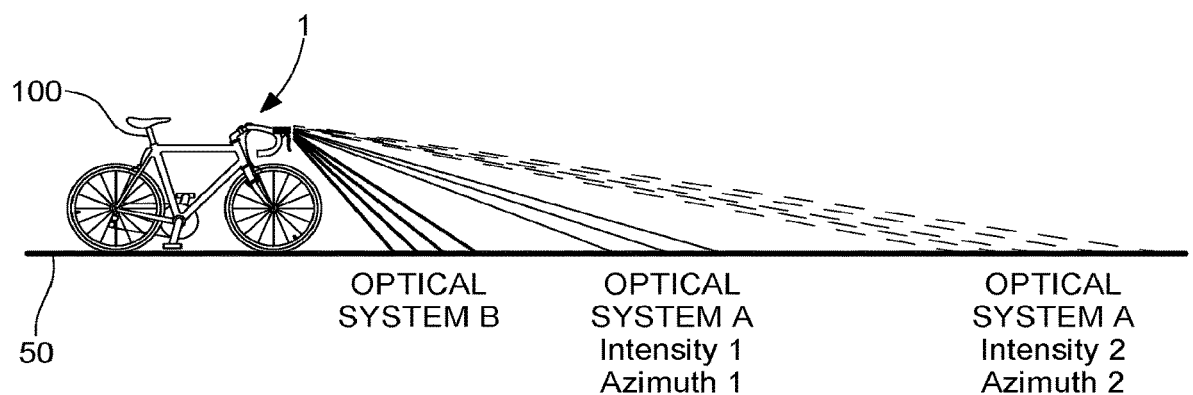
FIG. 2 diagrammatically illustrates a bicycle on a road or path with the activated light sources of the two optical systems A and B of the active lighting device, taking into account the light intensity and the speed measured in order to select and adjust the light intensity of at least some light sources or some groups of light sources of the optical system A according to the invention.

FIG. 2 diagrammatically illustrates a bicycle 100 on a road 50 or path with at least some activated light sources of the two light source arrangements of the two optical systems A and B of the active lighting device 1. The two light source arrangements are activated if the bicycle's speed exceeds a determined speed threshold and if the ambient light intensity is insufficient. If this is not the case, only the second light source arrangement of the optical system B is activated. Thus, the light intensity $I_{LUM}(V, I_{AMB})$ of the selected light sources of the optical system A depends on the speed v of the bicycle 100, which can be a bicycle, and on the ambient light intensity $I_{AMB}$. The light intensity $I_{LUM}(I_{AMB})$ of the selected light sources of the optical system B only depends on the ambient light intensity $I_{AMB}$.

As shown in FIG. 2, it can also be provided that the greater the bicycle's speed, the more the light intensity of the medium light beam generated by the first light source arrangement of the optical system A increases. Moreover, some light sources of the optical system A can be selected to orient the medium light beam of the first light source arrangement in order to illuminate further afield up to a vertical azimuth, which tends towards 0. The light intensity of the light sources can vary normally in inverse proportion to the ambient light intensity, or even in steps.

FIGS. 3a, 3b and 3c diagrammatically show a bicycle 100 on a road 50 or path taking a corner in order to orient the medium beam generated by the selected light sources of the optical systems A and B of the active lighting device 1. Each optical system A, B can be mounted, for example, on a handlebar of the bicycle 100. The one or more orientation or inclination detectors are, for example, a magnetometer 5b or an inclinometer 5c or an accelerometer 5c or a gyrometer 5c or a potentiometer 5a or a combination of the aforementioned detectors.

The orientation or inclination detector can be mounted on a support, such as a helmet of the user E of the bicycle 100 and can supply an orientation signal by bidirectional wireless communication to the control unit positioned on the handlebar of the bicycle 100. This allows the orientation of the medium beam generated by the selected light sources of the optical systems A and B to be controlled by a head movement of the user E of the bicycle 100.

In FIG. 3a, the two light source arrangements of the optical systems A and B of the lighting device 1 are activated. The medium light beam generated by the selected light sources must be oriented at an angle β as a function of the corner taken on the road 50.

In FIG. 3b, the control unit takes into account a rotational angle γ of the front wheel D of the bicycle as well as the angular movement ε of the head of the user E of the bicycle relative to the direction of the rear wheel F.

In FIG. 3c, the inclination of the bicycle with the user E at an angle δ relative to the road 50 can also be taken into account to orient the light sources.

According to the description provided hereinabove, a plurality of alternative embodiments of a portable active lighting device or of such a device installed on a bicycle are possible while still remaining within the scope of the invention defined by the claims hereafter.

The invention claimed is:

1. A portable active lighting device for a bicycle, wherein the device comprises:
   at least one power supply source,
   a first optical system with a first light source arrangement for long-distance illumination and controlled by a control unit connected to the power supply source, and each whereof, or groups whereof, is/are intended to generate a light beam having a different orientation direction at the output of the first light source arrangement,
   a second optical system with a second light source arrangement for short-distance illumination and controlled by the control unit connected to the power supply source, and each whereof, or groups whereof, is/are intended to generate a light beam having a different orientation direction at the output of the second light source arrangement,
   a light sensor for determining the light intensity of a location wherein the bicycle with the lighting device is situated and for supplying a measurement signal to the control unit, which is arranged so as to automatically activate at least the second optical system if the ambient light intensity falls below a determined light threshold, and so as to adapt the light intensity of some light sources or of some groups of light sources of the first optical system if activated and/or of the second optical system, and
   a speed sensor for determining the speed of the bicycle in use on a path or road, and for supplying a measurement signal to the control unit in order to activate the first light source arrangement of the first optical system from at least one determined speed threshold.

2. A portable active lighting device for a bicycle, wherein the device comprises:
   at least one power supply source,
   a first optical system with a first light source arrangement for long-distance illumination and controlled by a control unit connected to the power supply source, and each whereof, or groups whereof, is/are intended to generate a light beam having a different orientation direction at the output of the first light source arrangement,
   a second optical system with a second light source arrangement for short-distance illumination and controlled by the control unit connected to the power supply source, and each whereof, or groups whereof, is/are intended to generate a light beam having a different orientation direction at the output of the second light source arrangement,
   a light sensor for determining the light intensity of a location wherein the bicycle with the lighting device is situated and for supplying a measurement signal to the control unit, which is arranged so as to automatically activate at least the second optical system if the ambient light intensity falls below a determined light threshold, and so as to adapt the light intensity of some light sources or of some groups of light sources of the first optical system if activated and/or of the second optical system, and
   an orientation or inclination detector for supplying an orientation or inclination signal to the control unit in order to select and adjust the light intensity of at least some light sources or some groups of light sources of the first light source arrangement and/or of the second light source arrangement.

3. The device according to claim 1, wherein the control unit is arranged, as soon as the bicycle is put in use, such that the control unit automatically controls the lighting of the light sources of the first and second optical systems.

4. The device according to claim 2, wherein the control unit is arranged, as soon as the bicycle is put in use, such that the control unit automatically controls the lighting of the light sources of the first and second optical systems.

5. The device according to claim 1, wherein the device comprises an orientation or inclination detector in order to supply an orientation or inclination signal to the control unit in order to select and adjust the light intensity of at least some light sources or some groups of light sources of the first light source arrangement and/or of the second light source arrangement.

6. The device according to claim 2, comprising a speed sensor for determining the speed of the bicycle in use on a path or road, and for supplying a measurement signal to the control unit in order to activate the first light source arrangement of the first optical system from at least one determined speed threshold.

7. The device according to claim 1, wherein the first and second light source arrangements each comprise an array of light-emitting diodes arranged so as to each generate, or so as to generate in groups, a light beam having a different illumination direction at the output of the first and second light source arrangements, and wherein the first arrangement of light-emitting diodes is intended for long-distance illumination, whereas the second arrangement of light-emitting diodes is intended for short-distance illumination.

8. The device according to claim 2, wherein the first and second light source arrangements each comprise an array of light-emitting diodes arranged so as to each generate, or so as to generate in groups, a light beam having a different illumination direction at the output of the first and second light source arrangements, and wherein the first arrangement of light-emitting diodes is intended for long-distance illumination, whereas the second arrangement of light-emitting diodes is intended for short-distance illumination.

9. The device according to claim 1, wherein the control unit is arranged such that the control unit gradually adapts the light intensity of the light sources of the first arrangement of the first optical system and/or of the second arrangement of the second optical system, relative to the light intensity detected by the light sensor.

10. The device according to claim 2, wherein the control unit is arranged such that the control unit gradually adapts the light intensity of the light sources of the first arrangement of the first optical system and/or of the second arrangement of the second optical system, relative to the light intensity detected by the light sensor.

11. The device according to claim 1, wherein the control unit is arranged such that the control unit adapts the light intensity of the light sources of the first arrangement of the first optical system and/or of the second arrangement of the second optical system in steps, relative to the light intensity detected by the light sensor.

12. The device according to claim 2, wherein the control unit is arranged such that the control unit adapts the light intensity of the light sources of the first arrangement of the first optical system and/or of the second arrangement of the second optical system in steps, relative to the light intensity detected by the light sensor.

13. The device according to claim 1, wherein the control unit is a microcontroller having a memory wherein dates and times of day of the place in which the lighting device is situated are stored in order to allow for the functioning of the light sources of the first and second arrangements of the first and second optical systems from a certain time of day at a given date.

14. The device according to claim 2, wherein the control unit is a microcontroller having a memory wherein dates and times of day of the place in which the lighting device is situated are stored in order to allow for the functioning of the light sources of the first and second arrangements of the first and second optical systems from a certain time of day at a given date.

15. The device according to claim 7, wherein the control unit is a microcontroller having a memory in which a program for selecting and adjusting the intensity of the light-emitting diodes of the first and second light source arrangements is stored in order to provide a medium, variable-distance light as a function of the light intensity detected by the light sensor.

16. The device according to claim 8, wherein the control unit is a microcontroller having a memory in which a program for selecting and adjusting the intensity of the light-emitting diodes of the first and second light source arrangements is stored in order to provide a medium, variable-distance light as a function of the light intensity detected by the light sensor.

17. The device according to claim 2, wherein the orientation or inclination detector is formed by a magnetometer, and/or an inclinometer, and/or an accelerometer, and/or a gyrometer, and/or a potentiometer.

18. The device according to claim 5, wherein the orientation or inclination detector is formed by a magnetometer, and/or an inclinometer, and/or an accelerometer, and/or a gyrometer, and/or a potentiometer.

19. The device according to claim 1, wherein the speed sensor is formed by a GPS receiver or equivalent or by a magnetic sensor mounted on a fork of a wheel of the bicycle in order to detect the passage of a permanent magnet mounted on a spoke or on a rim of the wheel so as to determine the speed of the bicycle.

20. The device according to claim 6, wherein the speed sensor is formed by a GPS receiver or equivalent or by a magnetic sensor mounted on a fork of a wheel of the bicycle in order to detect the passage of a permanent magnet mounted on a spoke or on a rim of the wheel so as to determine the speed of the bicycle.

21. The device according to claim 2, wherein the orientation or inclination detector is arranged so as to be mounted on a support, such as a helmet of the user of the bicycle and so as to supply an orientation or inclination signal by bidirectional wireless communication to the control unit arranged on the bicycle with the first and second optical systems in order to orient the light sources of the first and second light source arrangements (6, 7) by a head movement of the user of the bicycle.

22. The device according to claim 5, wherein the orientation or inclination detector is arranged so as to be mounted on a support, such as a helmet of the user of the bicycle and so as to supply an orientation or inclination signal by bidirectional wireless communication to the control unit arranged on the bicycle with the first and second optical systems in order to orient the light sources of the first and second light source arrangements by a head movement of the user of the bicycle.

* * * * *